United States Patent [19]

Swanson

[11] 3,739,819

[45] June 19, 1973

[54] APPARATUS FOR STRAIGHTENING AXIAL LEADED COMPONENTS

[75] Inventor: Robert R. Swanson, Winston-Salem, N.C.

[73] Assignee: Western Electric Company Incorporated, New York, N.Y.

[22] Filed: Apr. 28, 1972

[21] Appl. No.: 248,463

[52] U.S. Cl. .......................... 140/147, 72/92, 72/93

[51] Int. Cl. .......................... B21f 1/02

[58] Field of Search .......................... 72/91, 92, 93, 94, 72/DIG. 10; 140/147

[56] References Cited

UNITED STATES PATENTS

| | | | |
|---|---|---|---|
| 2,860,686 | 11/1958 | Frank et al. | 72/92 |
| 2,867,262 | 1/1959 | Ainsworth et al. | 140/147 |
| 3,002,539 | 10/1961 | Rus | 140/147 |
| 3,633,634 | 1/1972 | Bryner | 140/147 |

FOREIGN PATENTS OR APPLICATIONS

| | | | |
|---|---|---|---|
| 909,192 | 10/1962 | Great Britain | 140/147 |

*Primary Examiner*—Charles W. Lanham
*Assistant Examiner*—E. M. Combs
*Attorney*—W. M. Kain, J. B. Hoofnagle, Jr. and W. L. Williamson

[57] ABSTRACT

A co-axial lead straightening apparatus has a pair of conically shaped shoes selectively positioned adjacent to a pair of rotatably mounted frustum shaped drums. At a discharge end, the distance between each shoe and its respective drum is held constant along the length of the drum and at a receiving end, the distance between each shoe and its respective drum increases from the base of the drum to the top of the drum. Bent leads of co-axial lead components moved between the drums and shoes at the receiving end are rotated through decreasing distances between the drums and shoes as the component is displaced from the receiving end to the discharge end to straighten the leads.

6 Claims, 4 Drawing Figures

Patented June 19, 1973

3,739,819

2 Sheets-Sheet 2

APPARATUS FOR STRAIGHTENING AXIAL LEADED COMPONENTS

BACKGROUND OF THE INVENTION

1. Field of the Invention

This invention relates to an apparatus for straightening co-axial leads of electrical components and, more particularly, to a wire straightening apparatus employing a conically shaped shoe to urge a lead into contact with a rotating frustum shaped drum.

2. Descrition of the Technical Problem

Electrical components, such as transistors, diodes, capacitors and resistors, are held in a predetermined order on a carrier which is feed to a component insertion machine. The component insertion machine removes individual electrical components from the carrier and selectively inserts them into a printed circuit board. In order to facilitate the insertion of these electrical components, it is required that the leads be straightened prior to mounting the components in the carrier. Of particular interest is straightening leads of those electrical components having physical characteristics of a central body with a lead extending axially from each end of the body. Such co-axially leaded components frequently have leads which have been bent or curved during a previous manufacturing process.

Co-axial lead straightening apparatuses, such as the one disclosed in U.S. Pat. No. 3,633,634 issued on Jan. 11, 1972 to Bryner et al., have a pair of spring biased cylindrical shoes juxtaposed to rotatably mounted cylindrical drums or sloping drums. The shoes are spaced a sufficient distance from the drums to accommodate the leads therebetween, while frictionally engaging the leads between the shoes and drums. As the drums rotate, the bent leads rotate between the drums and shoes while the component is displaced from a receiving end to a discharge end.

As will be appreciated, it is the frictional force between the leads and contact surfaces of the shoes and drums which rotates the leads to work and form the leads between the contact surfaces. Accordingly, if the leads are excessively bent, the force required to rotate the leads between the contact surfaces will exceed the frictional force and jamming will occur. This is particularly critical in the prior art when the shoes and drums are generally cylindrical in shape because the distance between the contact surfaces is essentially equal to the diameter of the leads at each point on the contact surfaces. As a result even relatively small bends in the leads are griped between the contact surfaces with a force which exceeds the frictional force thereby jamming the appparatus. If the drums are sloped, the lead has some freedom to flex away from the contact surface of the shoes when a bend engages that surface thereby reducing jamming. Even so, excessive bends still jam the apparatus. Also, as the distance between the contact surfaces at the discharge end is the same as the distance between the contact surfaces at corresponding points along the receiving end, bent leads may continuously flex away from the contact surfaces without sufficient working of the leads to straighten same.

SUMMARY OF THE INVENTION

An object of the present invention is to provide an apparatus for straightening a bent wire.

It is a further object of this invention to provide lead straightening facilities for straightening excessively bent axial leads of an electrical component.

With these and other objects in view, the invention contemplates an apparatus for straightening a wire. The apparatus has a rotatably mounted frustum shaped drum having a base and a top and a conically shaped shoe having a base and a top mounted about the drum with the top of the shoe adjacent the base of the drum. The distance between the top of the shoe and the base of the drum being sufficient to accommodate the wire therebetween while frictionally engaging the wire. Further, the shoe is spaced equidistant from the drum at a discharge end so that at a receiving end the distance between the shoe and the drum increases from the base to the top of the drum. Facilities are provided for rotating the drum so that a wire frictionally engaged between the top of the shoe and the base of the drum is rotated and displaced through decreasing distance between the shoe and drum from the receiving end towards the discharge end thereby working and forming the wire to straighten same.

BREIF DESCRIPTION OF THE DRAWING

DETAILED DESCRIPTION

Figure 1:
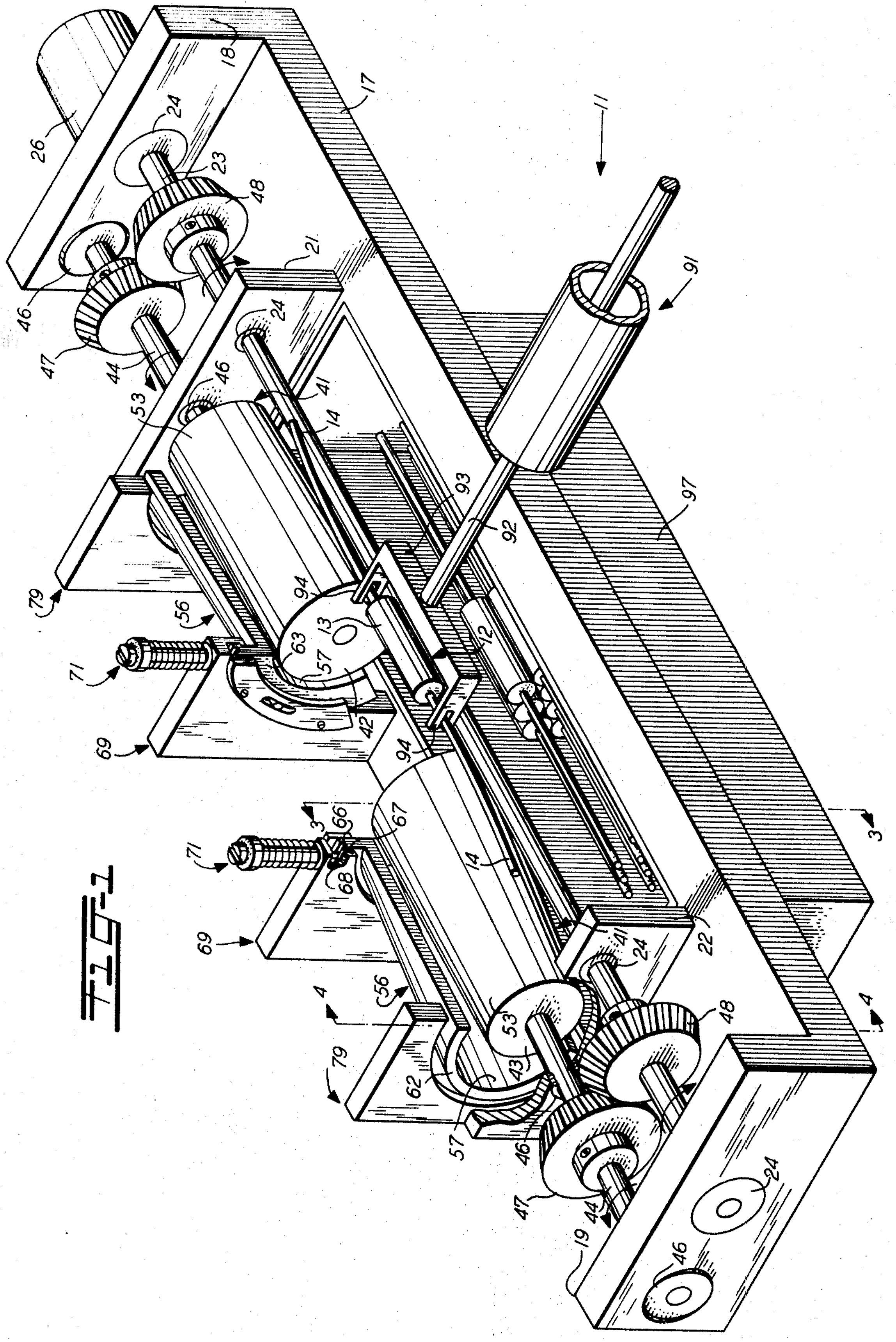
FIG. 1 is an isometric view of a lead straightening apparatus embodying the principles of the invention having portions thereof cut away for clarity of illustration.

Shown in FIG. 1 is a lead straightening apparatus 11 for straightening co-axial leads of electrical components 12 having a generally cylindrical central body 13 and co-axial leads 14—14 extending from opposite ends of the central body 13. The leads 14—14 are metal wires which may become bent and curved during manufacture of the component 12.

The lead straightening apparatus 11 has a base 17 on which are securely mounted a pair of outer walls 18 and 19 and a pair of intermediate walls 21 and 22. A drive shaft 23 is mounted for rotation in walls 18, 19, 21 and 22 by bearings 24—24 and is driven in a clockwise direction by motor 26 as viewed from the left in FIG. 1. A pair of frustum shaped drums 41—41 each having a base 42 and a top 43 are provided at the top 43 with a shaft 44 which is co-axial with the drum 41. The shafts 44—44 are mounted for rotation in walls 18, 19, 21 and 22 by bearings 46—46 and are driven in a counterclockwise direction as viewed from the left in FIG. 1 by beveled gears 47—47 and 48—48. In this manner, rotation of the shaft 23 in a clockwise direction by the motor 26, rotates the drums 41—41 in a counterclockwise direction as viewed from the left in FIG. 1.

Figure 2:
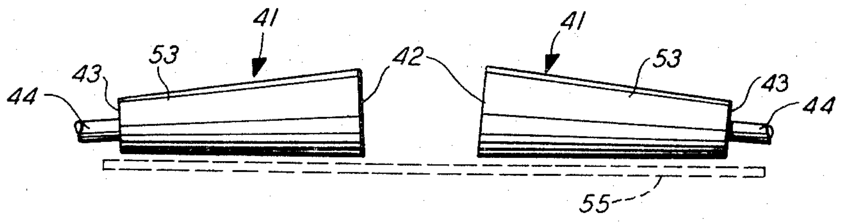
FIG. 2 illustrates the relative position of two drums shown in FIG. 1.
Figure 3:
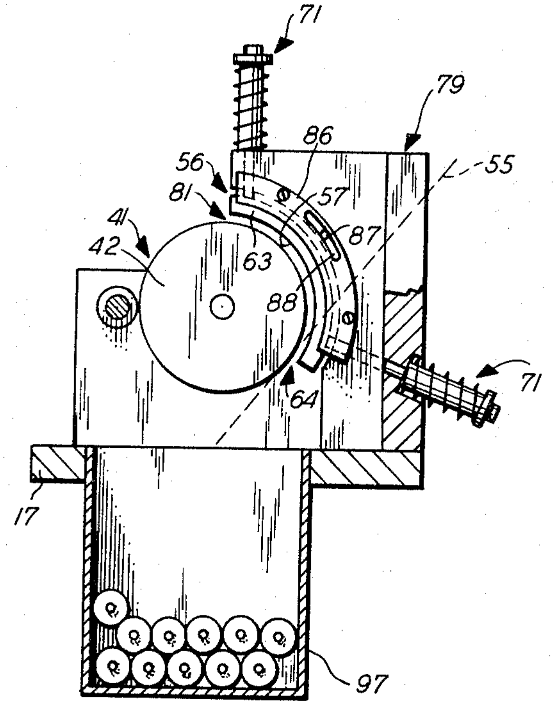
FIG. 3 is a sectional view taken along line 3—3 of FIG. 1.
Figure 4:
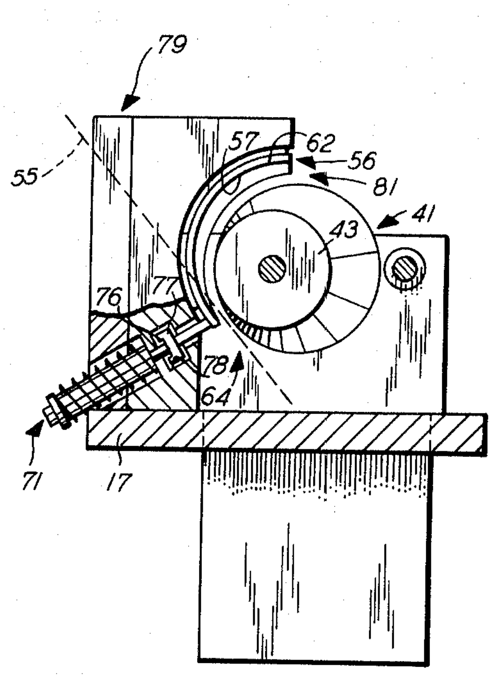
FIG. 4 is a sectional view taken along line 4—4 of FIG. 1.

Referring now to FIGS. 1 and 2, the drums 41—41 are mounted with the base 42 of each of the drums opposed to each other and spaced a sufficient distance apart to accommodate the body 13 of the component 12 therebetween. With the component body 13 between the bases 42—42, the leads 14—14 extend over contact surfaces 53—53 of the drums 41—41. It should be noted that the shafts 44—44 are not co-axial with respect to each other. As best seen in FIGS. 2, 3 and 4, the shafts 44—44 are canted so that the contact surface 53 of each drum has a common tangent plane 55.

As shown in FIGS. 1, 3 and 4, a conically shaped shoe 56 having a concave contact surface 57 is mounted adjacent each of the drums 41—41 such that the contact surfaces 57—57 of the shoes 56—56 is opposed to the contact surface 53—53 of the drums 41—41. As the shoes 56—56 are conical, the concave contact surfaces 57—57 have a greater radius of curvature at base 62 than at top 63 of the shoes. The contact surface 57 of the shoes 56—56 is positioned directly opposite to the contact surface 53 of the drums 41—41 with the top 63 of the shoes adjacent the base 42 of the drums and the base 62 of the shoes adjacent the top 43 of the drums. The shoes are spaced from the drums so that the distance between the contact surfaces 53 and 57 is constant at the base 42 of the drum and the top 62 of the shoe as well as along the length of the drum at discharge end 64, see FIGS. 3 and 4. The shafts 44—44 are canted so that the portion of the contact surface 53 of the drums 41—41 which lies in the tangential plane 55 is directly opposite the contact surface 57 of the shoes 56—56 at the discharge end 64. This in effect positions the discharge ends 64—64 along a straight line so that, as the leads are frictionally engaged by the contact surfaces 53 and 57 at the discharge ends 64—64, the leads will be held in co-axial relationship. In this manner, not only are bends removed due to the working and forming of the leads between the contact surfaces 53 and 57, but curves in the leads are also straightened so that the leads are substantially co-axial.

Referring now to FIG. 1, the top 63 of each shoe is provided with a rib 66 and an extension 67 which sets in a groove 68 formed in a retaining member 69 which is securely mounted on the base 17. The extension 67 engages the groove 68 to limit movement of the contact surface 57 towards the contact surface 53 at the base 42 of the drum 41 to a distance equal to or slightly less than the diameter of the leads 14—14 of the component 12.

Referring now to FIG. 4, the base 62 of each shoe at the discharge end 64 is provided with a rib 76 and an extension 77 which sets in a groove 78 formed in a retaining member 79 which is securely mounted on the base 17. The extension 77 engages the groove 78 to limit movement of the contact surface 57 towards the contact surface 53 at the top 43 of the drum 41 to a distance equal to or slightly less than the diameter of the leads 14—14 of the component 12 (shown in FIG. 1). By providing the extension 77 at the base 62 of each shoe at the discharge end, and the extension 67 at the top 63 of each shoe, the contact surface 57 is maintained equidistant from the contact surface 53 at the discharge end 64.

Movement of the contact surface 57 of the shoe 56 away from the contact surface 53 is controlled by pressure plungers 71—71 (FIGS. 3 and 4). The pressure plungers 71—71 engage the ribs 66 and 76 and bias the extensions 67 and 77 into engagement with the grooves 68 and 78, respectively (shown better in FIGS. 1 and 4). In this manner, leads inserted between contact surfaces 53 and 57 are frictionally engaged at the base 42 and top 63 so that rotation of the drums 41—41 rotates the leads 14—14 toward the discharge end 64 where the leads are held in a co-axial relationship.

As will be noted, the distance between the contact surface 57 at the base 62 of the shoe 56 and the contact surface 53 at the top 43 of the drum 41 decreases from receiving end 81 towards the discharge end 64 as shown in FIG. 4. Also, the distance between the contact surfaces 53 and 57 at the receiving end 81 increases from the top 63 to the base 62 of the shoe 56 as seen most clearly in FIG. 1.

Increasing the taper of the frustum shaped drum and the taper of the conically shaped shoe increases the distance between the contact surfaces 53 and 57 at the receiving end 81 from the base 42 to the top 43 of the drum. The greater the distance at the receiving end between the contact surfaces, the more excessively the lead can be bent without jamming the apparatus because the leads can more freely rotate between the contact surfaces of te shoe and drum.

The pressure plungers 71—71 permit the shoes to float relative to the drums to accommodate the bent leads between the shoe and drum while urging the shoe toward their respective drum to reduce the bends in the leads while the component is displaced from the receiving end 81 to the discharge end 64. The amount of pressure exerted by the pressure plungers 71—71 on the ribs 64 and 76 of the shoes depends on the diameter and malleability of the leads 14—14 of the component 12. For example, a larger diameter lead requires more pressure to be exerted by the shoe to remove the bends in the leads than a smaller diameter lead. A malleable lead, such as a nickel lead, requires less pressure to be exerted by the shoe to remove the bends in the leads than a less malleable lead, such as a steel lead. The pressure plungers 71—71 used to bias the shoe 57 towards the drum 42 may be the type sold by Vlier Engineering Corp. cat. no. SD–2.

In summary, as the leads 14—14 are frictionally engaged by the contact surfaces 53 and 57 at the base 42 of the drum and top 63 of the shoe, rotation of the drums 41—41 will rotate the leads 14—14 and advance the components 12 from the receiving end 81 to the discharge end 64. When the distance between the contact surfaces at the receiving end is sufficiently large at top 43 of the drum and base 62 of the shoe, the bent leads will freely rotate between the contact surfaces without jamming the apparatus. However, as the leads are rotated and advanced towards the discharge end 64, the gradual reduction in the distance between the contact surfaces coupled with the bias of the shoes towards the drums by pressure plungers 71—71 serves to work and form the leads thereby straightening same.

Referring to FIG. 3 a side plate 86 is secured to the retaining member 69 holds the rib 66 of the shoe 56 in the groove 68 to prevent lateral movement of the shoe 56 with respect to the drum 41. To limit rotational movement of the shoe 56 relative to the drum 41, the rib 66 is provided with a dowel 87 which rides in a slot 88 of the plate 86.

The contact surfaces of the drums and shoes may be made of a yieldable frictional material, such as leather, polyurethane, or plastic. Although not necessary, it has been found that providing a yieldable frictional material on the contact surface prevents scoring and cold working of the leads. Further, it provides better frictional engagement of the leads between the drum and shoe so that as the drum rotates, the leads are rotated between the shoes and drums while the component is displaced from the receiving end to the discharge end.

Referring once again to FIG. 1, there is shown an air cylinder 91 having a piston 92 with a fork member 93 mounted on the end of the piston 92 for individually moving the components 12 having bent axial leads 14—14 from feeding facilities (not shown) into the receiving end 81 of the straightening apparatus 11. During the first half of a cycle, the air cylinder 91 moves the piston 92 to the right as viewed in FIG. 1 past the feeding facilities (not shown). During the last half of the cycle, the air cylinder moves the piston to the left as viewed in FIG. 1 through the feeding facilities (not shown) to move the fork member 93 into engagement with a component 12, such that the leads 14—14 are held in fingers 94—94 of the fork member 93. Continued movement of the piston 92 to the left moves the fork member 93 between the bases 42—42 of the drums 41—41 at the receiving end 81. A cycle of the air cylinder is completed with every quarter turn of the drums.

Continuing reference to FIG. 1, as the fork member 93 moves to the left, as viewed in FIG. 1, between the bases 42—42 of the drums 41—41, the leads 14—14 of the electrical component 12 are urged between the shoes and drums at the receiving end 81. The shoes 56—56 are urged away from their respective drums 41—41 by the leads to accommodate the leads between the top 63—63 of the shoes 56—56 and the base 42—42 of the drums 41—41. The pressure plungers 71—71 urge the shoes 56—56 toward their respective drums to frictionally engage the leads between the top of the shoes and the bases of the drums. As the drums 41—41 rotate, the leads are rotated between the contact surface 57 of the shoes and the contact surface 53 of the drums while the component 12 is displaced from the receiving end 81 to the discharge end 64. By providing an increasing distance at the receiving end between the shoes and drums from the base of the drum to the top, excessively bent leads are permitted to freely rotate without jamming the apparatus. As the component is displaced toward the discharge end 64, the distance between the shoes and drums gradually decrease thereby reducing the bends in the leads. At the discharge end the distance between the shoes and drums are equidistance to have the leads straight and co-axial as they exit at the discharge end 64 into a tray 97.

OPERATION

Referring to FIGS. 1, 3, and 4, each of the drums 41—41 is 2 inches in length having a 4 inch diameter base 42—42 and a 3⅞ inch diameter top 43—43 thereby providing the drums 41—41 with a 2½° taper from the base 42 of the drum to the top 43. Each of the shoes 56—56 is 2 inches in length having a 4¾inch diameter base 62 and a 4 inch diameter top 63 thereby providing the shoes 56—56 with a 10° taper from the base 62 of the shoe to the top 62. The arcuate length of the base 62 and the top 63 of the shoe is approximately 2¼ inches and 1½ inches respectively. The distance between the contact surface 53 and 57 at the base 42 of the drums and the top 62 of the shoe as well as along the length of the drum at the discharge end 64 (see FIG. 3 and 4) is 0.009 inches. By setting the contact surfaces 53 and 57 equidistance at the discharge end 64, the distance between the contact surfaces 53 and 57 at the receiving end 81 increases from the base of the drum to the top of the drum thereby allowing excessively bent leads to freely rotate between the contact surfaces at the receiving end without jamming the apparatus.

Referring now to FIG. 1 electrical components 12 having a central cylindrical body 13 and bent leads 14—14 having a diameter of 0.032 inches and extending axially from each end are loaded in the feeding facility (not shown). The motor 26 is energized to rotate the shaft 23 at 7,500 RPM in a clockwise direction which rotates the drums 41—41 in a counterclockwise direction, as viewed from the left side in FIG. 1 through the gears 47—47 and 48—48.

The air cylinder 91 moves the piston 92 and the fork member 93 to the right, as viewed in FIG. 1, past the feeding facilities (not shown). Then the air cylinder moves the piston and fork member to the left, as viewed in FIG. 1, through the feeding facilities (not shown) whereat the fingers 94—94 engage a component 12 with the leads 14—14 in the fingers 94—94.

As the piston 92 continues to move to the left, as viewed in FIG. 1, the fork member 93 moves between the bases 42—42 of the drums 41—41, while urging the leads by way of the fingers 94—94 between the shoes 56—56 and drums 41—41 respectively at the receiving end 81. The shoes are urged away from their respective drums against the pressure plungers 71—71 to accommodate the leads between the base of the drums and the top of the shoes at the receiving end. The pressure plungers 71—71 urge the shoes toward the drums to frictionally engage the leads of the component between the base of the drums and the top of the shoes.

As the drums continue to rotate, the leads rotate between the shoes and the drums while the component is displaced from the receiving end 81 toward the discharge end 64. As the component 12 is displaced, the leads are rotated and moved between decreasing distances between the drums and shoes to straighten the leads. At every quarter turn of the drums the air cylinder 91 inserts a component 12 into the receiving end of the apparatus.

The components 12 are accommodated by the shoes moving against the pressure plungers 71—71 (see FIGS. 1, 3 and 4). As the leads exit between the shoes and drums at the discharge end into the tray 97, the leads are straight and co-axial.

As can be appreciated, providing a lead straightening apparatus having frustum shaped drums and conically shaped shoes positioned such that at the receiving end the distance between the contact surfaces of the shoe and drum increases from the base of the drum to the top of the drum and at the discharge end the contact surface of the shoe and drum are spaced equidistant from each other, excessively bent leads can be straightened without the leads jamming the apparatus.

What is claimed is:

1. An apparatus for straightening a wire comprising:

a rotatably mounted frustum shaped drum having a base and a top;

a conically shaped shoe having a base and a top mounted about said drum with the top of said shoe adjacent the base of said drum and the base of said shoe adjacent the top of said drum, the distance between the top of said shoe and the base of said drum being sufficient to accommodate the wire therebetween while frictionally engaging the wire, said shoe being spaced equidistant from said drum at a discharge end so that at a receiving end the distance between said drum and said shoe increases from the base to the top of said drum; and means for rotating said drum so that a wire frictionally engaged between the top of said shoe and the base of said drum is rotated and displaced through decreasing distances between said shoe and said drum from the receiving end towards the discharge end thereby working and forming the wire to straighten same.

2. The apparatus as set forth in claim 1, further including:

means for biasing said shoe toward said drum to accommodate the wire between the top of said shoe and the base of said drum while frictionally engaging the wire between the top of said shoe and the base of said drum.

3. Apparatus for straightening co-axial leads of electrical components comprising:

a pair of rotatably mounted frustum shaped drums each having a contact surface extending between a base and a top, the base of each of said drums being opposed and adjacent to one another;

a conically shaped shoe having a concave contact surface extending between a base and a top mounted about each of said drums with the top of each of said shoes spaced from the base of each of said drums and the base of each of said shoes spaced from the top of said drum, the contact surface being spaced equidistant at the top of the shoe and the base of the drum to accommodate the leads of the electrical component therebetween while frictionally engaging the leads, said shoes being spaced equidistant from the contact surface of each of said drums at a discharge end so that at a receiving end the distance between the contact surfaces increases from the base to the top of said drum; and means for rotating said drums so that leads frictionally engaged between each one of the tops of said shoes and each one of the bases of said drums is rotated through decreasing distances between said contact surfaces as the component is displaced toward the discharge end thereby working and forming the leads to straighten same.

4. The apparatus as set forth in claim 3, further including:

means for biasing the contact surfaces of each of said shoes towards the contact surfaces of each of said drums.

5. An improved co-axial lead straightening apparatus of the type wherein co-axial leads of an electrical component are rotated between contact surface of rotating drums and contact surface of shoes as the component is displaced from a receiving end to a discharge end, wherein the improvement comprises:

a pair of rotatably mounted frustum shaped drums each having a contact surface extending between a base and a top, the base of each of said drums being opposed and adjacent to one another; and a conically shaped shoe having a concave contact surface extending between a base and a top mounted about each of said drums with the top of each of said shoes spaced from the base of each of said drums and the base of each of said shoes spaced from the top of each of said drums, the contact surfaces being spaced equidistant at the top of the shoe and the base of the drum to accommodate the leads of the electrical component therebetween while frictionally engaging the leads, said shoes being spaced equidistant from the contact surface of each of said drums at the discharge end so that at the receiving end the distance between the contact surfaces increases from the base to the top of said drums.

6. An apparatus for straightening co-axial leads of an electrical component wherein the leads extend from opposite ends of a body comprising:

a pair of rotatably mounted frustum shaped drums having a contact surface extending between a base and a top, the base of each of said drums being opposed to one another and spaced a sufficient distance apart to accommodate the body of the component therebetween, the leads of the component extending over the contact surface of each of said drums;

a pair of conically shaped shoes each having a concave surface extending between a base and a top and each having a first edge and a second edge between the base and the top;

means for supporting said shoes to position the tops of each of said shoes about each of the bases of each of said drums and the base of each of said shoes about the top of each of said drums, the contact surfaces being spaced equidistant at the top of said shoe and the base of said drums to accommodate the leads of the electrical component therebetween while frictionally engaging the leads, the first edge of each of said shoes being spaced equidistant from the contact surface of each of said drums to define a discharge end so that at a receiving end the distance between the second edge of each of said shoes and the contact surface of each of said drums increases from the base to the top of said drums; and means for rotating said drums so that leads frictionally between the tops of said shoes and the bases of said drums is rotated through decreasing distance between the contact surfaces as the component is displaced toward the discharge end thereby working and forming the leads to straighten same.

* * * * *